US012770755B2

(12) United States Patent
Fripp et al.

(10) Patent No.: US 12,770,755 B2
(45) Date of Patent: Oct. 20, 2026

(54) PROTECTING ESP CABLES FROM H2S WITH LIQUID CONDUCTOR

(71) Applicant: Halliburton Energy Services, Inc., Houston, TX (US)

(72) Inventors: Michael Linley Fripp, Singapore (SG); Chad William Glaesman, Singapore (SG); Gireesh Bhat, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 686 days.

(21) Appl. No.: 18/191,627

(22) Filed: Mar. 28, 2023

(65) Prior Publication Data

US 2024/0331894 A1 Oct. 3, 2024

(51) Int. Cl.
*H01B 7/00* (2006.01)
*E21B 43/12* (2006.01)

(52) U.S. Cl.
CPC ......... *H01B 7/0027* (2013.01); *E21B 43/128* (2013.01)

(58) Field of Classification Search
CPC .................................................... H01B 7/0027
USPC .............................................................. 174/9
See application file for complete search history.

(56) References Cited

U.S. PATENT DOCUMENTS

| | | | |
|---|---|---|---|
| 2011/0048765 A1 | 3/2011 | Eggertsen et al. | |
| 2011/0253408 A1 | 10/2011 | Magner et al. | |
| 2013/0006339 A1 | 1/2013 | March et al. | |
| 2013/0153260 A1 | 6/2013 | Favereau et al. | |
| 2021/0210252 A1* | 7/2021 | Varkey ................. | H01B 7/1895 |

FOREIGN PATENT DOCUMENTS

| | | | |
|---|---|---|---|
| CN | 114914025 | 8/2022 | |
| WO | 2017157446 | 9/2017 | |
| WO | WO-2017157446 A1 * | 9/2017 | ............ H01B 13/06 |

OTHER PUBLICATIONS

"PCT Application No. PCT/US2023/065116, International Search Report and Written Opinion", Dec. 18, 2023, 11 pages.

* cited by examiner

*Primary Examiner* — Stanley Tso
(74) *Attorney, Agent, or Firm* — DeLizio, Peacock, Lewin and Guerra, LLP

(57) ABSTRACT

In some implementations, an electrical cable for use in a wellbore proximate to a subsurface formation may comprise a conductive element, where the conductive element comprises one or more electrically conductive fibers. The electrical cable may additionally comprise a conductive binder configured to melt to form a liquid conductor that is configured to, when in a liquid state, surround the conductive element.

7 Claims, 10 Drawing Sheets

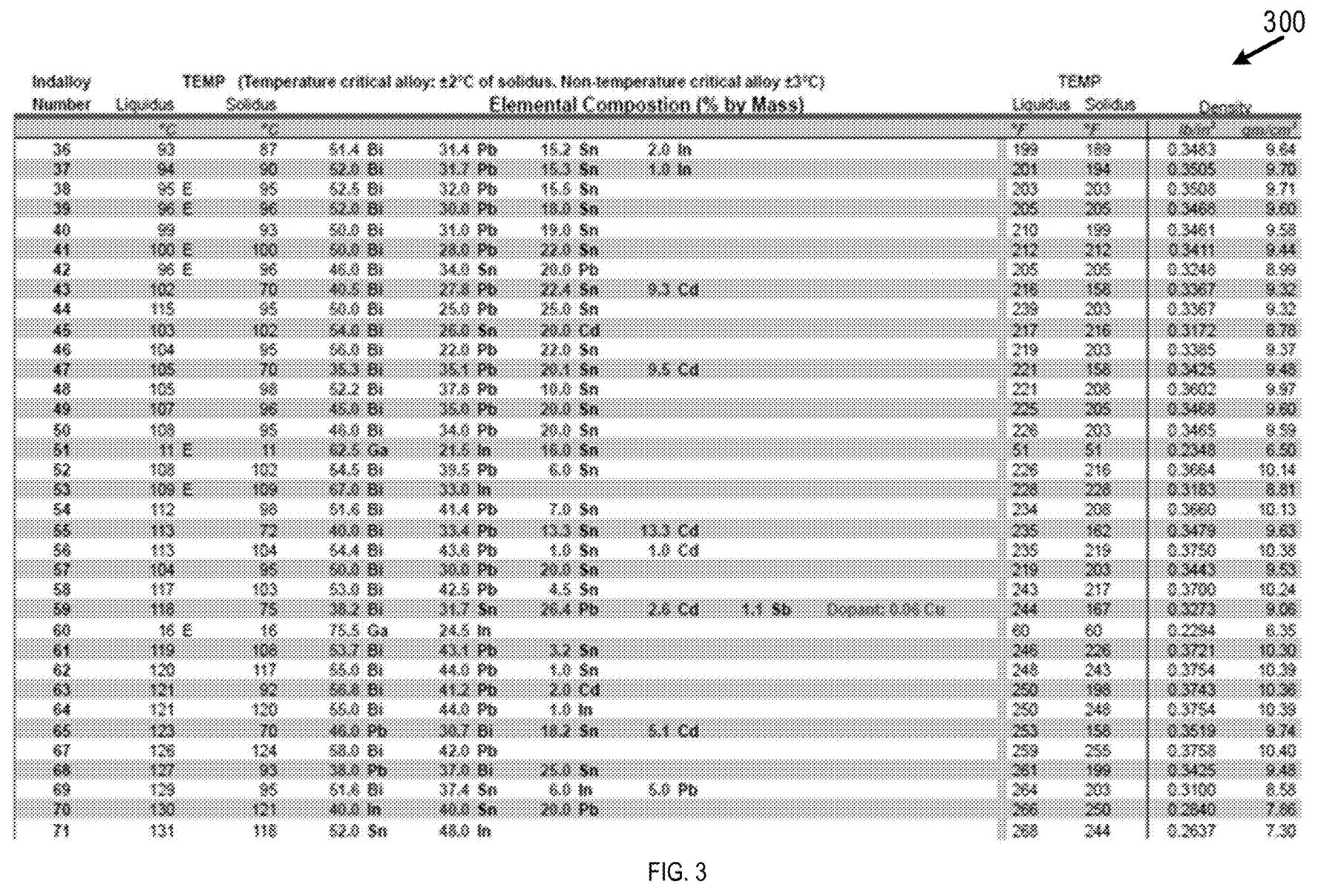

300

| Indalloy Number | TEMP (Temperature critical alloy: ±2°C of solidus. Non-temperature critical alloy ±3°C) Liquidus °C | Solidus °C | Elemental Compostion (% by Mass) | | | | | | TEMP Liquidus °F | Solidus °F | Density lb/in³ | gm/cm³ |
|---|---|---|---|---|---|---|---|---|---|---|---|---|
| 36 | 93 | 87 | 51.4 Bi | 31.4 Pb | 15.2 Sn | 2.0 In | | | 199 | 189 | 0.3463 | 9.64 |
| 37 | 94 | 90 | 52.0 Bi | 31.7 Pb | 15.3 Sn | 1.0 In | | | 201 | 194 | 0.3505 | 9.70 |
| 38 | 95 E | 95 | 52.5 Bi | 32.0 Pb | 15.5 Sn | | | | 203 | 203 | 0.3508 | 9.71 |
| 39 | 96 E | 96 | 52.0 Bi | 30.0 Pb | 18.0 Sn | | | | 205 | 205 | 0.3466 | 9.60 |
| 40 | 99 | 93 | 50.0 Bi | 31.0 Pb | 19.0 Sn | | | | 210 | 199 | 0.3461 | 9.58 |
| 41 | 100 E | 100 | 50.0 Bi | 28.0 Pb | 22.0 Sn | | | | 212 | 212 | 0.3411 | 9.44 |
| 42 | 96 E | 96 | 46.0 Bi | 34.0 Sn | 20.0 Pb | | | | 205 | 205 | 0.3248 | 8.99 |
| 43 | 102 | 70 | 40.5 Bi | 27.8 Pb | 22.4 Sn | 9.3 Cd | | | 216 | 158 | 0.3367 | 9.32 |
| 44 | 115 | 95 | 50.0 Bi | 25.0 Pb | 25.0 Sn | | | | 239 | 203 | 0.3367 | 9.32 |
| 45 | 103 | 102 | 54.0 Bi | 26.0 Sn | 20.0 Cd | | | | 217 | 216 | 0.3172 | 8.78 |
| 46 | 104 | 95 | 56.0 Bi | 22.0 Pb | 22.0 Sn | | | | 219 | 203 | 0.3385 | 9.37 |
| 47 | 105 | 70 | 35.3 Bi | 35.1 Pb | 20.1 Sn | 9.5 Cd | | | 221 | 158 | 0.3425 | 9.48 |
| 48 | 105 | 98 | 52.2 Bi | 37.8 Pb | 10.0 Sn | | | | 221 | 208 | 0.3602 | 9.97 |
| 49 | 107 | 96 | 45.0 Bi | 35.0 Pb | 20.0 Sn | | | | 225 | 205 | 0.3468 | 9.60 |
| 50 | 108 | 95 | 46.0 Bi | 34.0 Pb | 20.0 Sn | | | | 226 | 203 | 0.3465 | 9.59 |
| 51 | 11 E | 11 | 62.5 Ga | 21.5 In | 16.0 Sn | | | | 51 | 51 | 0.2348 | 6.50 |
| 52 | 108 | 102 | 54.5 Bi | 39.5 Pb | 6.0 Sn | | | | 226 | 216 | 0.3664 | 10.14 |
| 53 | 109 E | 109 | 67.0 Bi | 33.0 In | | | | | 228 | 228 | 0.3183 | 8.81 |
| 54 | 112 | 98 | 51.6 Bi | 41.4 Pb | 7.0 Sn | | | | 234 | 208 | 0.3660 | 10.13 |
| 55 | 113 | 72 | 40.0 Bi | 33.4 Pb | 13.3 Sn | 13.3 Cd | | | 235 | 162 | 0.3479 | 9.63 |
| 56 | 113 | 104 | 54.4 Bi | 43.6 Pb | 1.0 Sn | 1.0 Cd | | | 235 | 219 | 0.3750 | 10.38 |
| 57 | 104 | 95 | 50.0 Bi | 30.0 Pb | 20.0 Sn | | | | 219 | 203 | 0.3443 | 9.53 |
| 58 | 117 | 103 | 53.0 Bi | 42.5 Pb | 4.5 Sn | | | | 243 | 217 | 0.3700 | 10.24 |
| 59 | 118 | 75 | 38.2 Bi | 31.7 Sn | 26.4 Pb | 2.6 Cd | 1.1 Sb | Dopant: 0.06 Cu | 244 | 167 | 0.3273 | 9.06 |
| 60 | 16 E | 16 | 75.5 Ga | 24.5 In | | | | | 60 | 60 | 0.2294 | 6.35 |
| 61 | 119 | 108 | 53.7 Bi | 43.1 Pb | 3.2 Sn | | | | 246 | 226 | 0.3721 | 10.30 |
| 62 | 120 | 117 | 55.0 Bi | 44.0 Pb | 1.0 Sn | | | | 248 | 243 | 0.3754 | 10.39 |
| 63 | 121 | 92 | 56.8 Bi | 41.2 Pb | 2.0 Cd | | | | 250 | 198 | 0.3743 | 10.36 |
| 64 | 121 | 120 | 55.0 Bi | 44.0 Pb | 1.0 In | | | | 250 | 248 | 0.3754 | 10.39 |
| 65 | 123 | 70 | 46.0 Pb | 30.7 Bi | 18.2 Sn | 5.1 Cd | | | 253 | 158 | 0.3519 | 9.74 |
| 67 | 126 | 124 | 58.0 Bi | 42.0 Pb | | | | | 259 | 255 | 0.3758 | 10.40 |
| 68 | 127 | 93 | 38.0 Pb | 37.0 Bi | 25.0 Sn | | | | 261 | 199 | 0.3425 | 9.48 |
| 69 | 129 | 95 | 51.6 Bi | 37.4 Sn | 6.0 In | 5.0 Pb | | | 264 | 203 | 0.3100 | 8.58 |
| 70 | 130 | 121 | 40.0 In | 40.0 Sn | 20.0 Pb | | | | 266 | 250 | 0.2840 | 7.86 |
| 71 | 131 | 118 | 52.0 Sn | 48.0 In | | | | | 268 | 244 | 0.2637 | 7.30 |

FIG. 3

PROTECTING ESP CABLES FROM H2S WITH LIQUID CONDUCTOR

TECHNICAL FIELD

The disclosure generally relates to wellbores formed in subsurface formations, and in particular, artificial lift systems used to extract hydrocarbons from subsurface formations.

BACKGROUND

Different wellbore applications may include a motor or other components that require a cable for power and/or communication between the surface and downhole. For example, artificial lift systems such as electric submersible pumps (ESPs) may assist in hydrocarbon production when a subsurface reservoir may no longer provide a substantial downhole pressure to lift fluids to the surface. Such ESPs may require a supply of power for operation. For example, an ESP may utilize a conductive cable to supply power and/or communications between components at the surface of the wellbore and components positioned downhole in the wellbore. This cable may be exposed to corrosive agents downhole such as hydrogen sulfide (H2S) which may cause premature failure of the cable and ultimately, the ESP.

BRIEF DESCRIPTION OF THE DRAWINGS

Implementations of the disclosure may be better understood by referencing the accompanying drawings.

FIG. 3 depicts a table of example fusible alloys and their properties, according to some implementations.

DESCRIPTION OF SOME EXAMPLE IMPLEMENTATIONS

The description that follows includes example systems, methods, techniques, and program flows that embody implementations of the disclosure. However, it is understood that this disclosure may be practiced without these specific details. In other instances, well-known instruction instances, protocols, structures, and techniques have not been shown in detail in order not to obfuscate the description.

Overview

Downhole pump systems, such as those described below, may be utilized in the oil field to pump fluid to the surface when the natural pressure of a reservoir may no longer do so. One such pump system may comprise an electronic submersible pump (ESP) which may be powered via an electrical cable by equipment at the surface and may contain a motor which drives a series of impellers to convey fluid through the pump and to a production tubing. The electrical cable of the ESP may fail in corrosive environments in the subsurface, such as those containing high concentrations of hydrogen sulfide ($H_2S$). $H_2S$ has the potential to migrate through insulation on the electrical cable and may eventually damage an electrical conductor within the cable in high partial pressure concentrations.

Traditionally, to avoid $H_2S$ from damaging the electrical conductor, an electrical cable section installed below a production packer may incorporate an impervious lead barrier and a dual-layer insulation system consisting of a primary layer of polyimide tape and a secondary layer of ethylene propylene diene rubber (EPDM). The EPDM insulation may be permeable to $H_2S$, but a metallic layer such as lead disposed on the interior or exterior of the cable may mitigate $H_2S$ penetration. However, lead may not have sufficient mechanical strength and may add weight to the electrical cable. The use of a lead jacket around the electrical conductor or around the insulation also may be expensive, and swelling of the EPDM may eventually fracture the lead jacket.

Therefore, to protect the electrical conductor without the use of a lead, cadmium, or other heavy metal protection, a fault-tolerant cable design comprising a conductive binder may be incorporated into the zone between the packer and the ESP where $H_2S$, brines, and other chemicals may attack and cause electrical failures in the cable. The electrical failures typically arise from breaks in the electrical wiring. A composite conductive cable may be created from a conductive element (e.g., copper wires) in a conductive binder matrix. The conductive binder may be configured to melt at a low temperature. The conductive binder may be electrically conductive in both its liquid and solid state, and, as a liquid conductor, the conductive binder may bridge any electrical failures in the copper wire.

Example Well System

Figure 1:
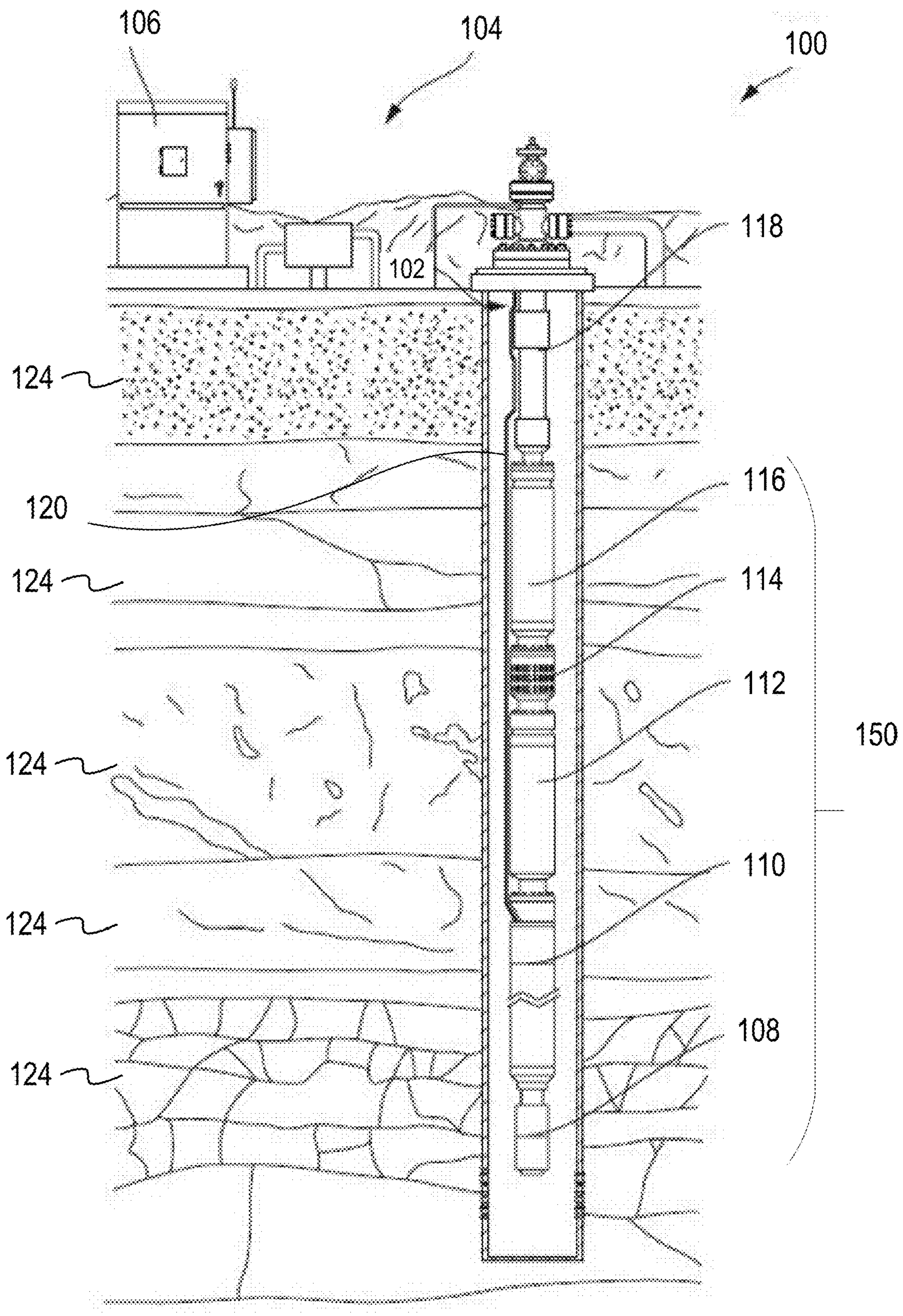
FIG. 1 depicts a schematic representation of an example well system comprising an electronic submersible pump (ESP), according to some implementations.

FIG. 1 depicts a schematic representation of an example well system 100 comprising an electronic submersible pump (ESP), according to some implementations. The well system 100 may represent an applicable environment in which a substance may be pumped through a wellbore 102 toward the surface. For example, various types of hydrocarbons or fluids may be pumped or otherwise transported from the wellbore 102 to the surface 104. In some implementations, the well system 100 may be positioned (at least partially) in the wellbore 102 below the surface 104 in one or more subsurface formations 124. The wellbore 102 may comprise a vertical, deviated, horizontal, or any other type of wellbore. The wellbore 102 may be defined in part by a casing that may extend from the surface 104 to a selected downhole location. Portions of the wellbore 102 that do not comprise the casing may be referred to as open hole. While the well system 100 illustrates a land-based subterranean environment, example implementations may include any well site environment including a subsea environment. In another example, the well system 100 may represent a geothermal environment in which water may be pumped through the wellbore 102 toward the surface 104.

In some implementations, the well system 100 may include an ESP system 150 disposed within the wellbore 102. In other implementations, various other production, artificial lift, or pump system configurations may be possible. For example, the ESP system 150 may instead be comprised of a rod pump system, a progressive cavity pump system, and/or any other suitable pump system or combination thereof. The ESP system 150 may include a surface control system 106 as well as one or more components disposed downhole in the wellbore 102. Specifically, the ESP system 150 may include a gauge 108, a motor 110, a seal section 112 (also referred to as an equalizer), a gas separator 114, a pump 116, a production tubing 118, and an electrical cable 120. The components of the ESP system 150, in combination, may function to form various tasks related to pumping a substance through the wellbore 102 toward the surface 104. In particular, the surface control system 106 may function to control and interact with the various downhole components for performing various tasks related to pumping a substance through the wellbore 102 towards the surface 104. In some implementations, the surface control system 106 may be configured to determine pressures, flow rates, and other properties of the ESP system 150.

The gauge 108 may function to generate downhole data of one or more monitored parameters. Specifically, the downhole data may include any suitable data that may be measurable downhole. For example, the gauge 108 may be configured to obtain measurements of temperature, pressure, vibrations, etc. For example, the gauge 108 may include a pressure gauge that is configured to identify a wellbore pressure at an intake of the pump 116. However, other sensors may be used at the gauge 108. Additionally, the gauge 108 may function to measure parameters for preventing or reducing formation damage caused by overproduction through the wellbore 102. The gauge 108 may communicate with the surface control system 106 in generating downhole data. Specifically, the gauge 108 may provide the downhole data as telemetry data to the surface control system 106, where the downhole data may be used in controlling a production operation of the ESP system 150. In some implementations, a flow meter or similar sensor may be disposed at the surface 104 to measure a parameter of the downhole fluid.

The motor 110 functions to drive the pump 116. Specifically, the motor 110 may receive power from the surface through the electrical cable 120 and may drive the pump 116 in lifting downhole fluid and other produced substances towards the surface. The motor 110 may be an applicable and appropriately sized motor that may drive the pump 116. In some implementations, the motor 110 may include an electric submersible motor configured or operated to turn the pump 116 and may, for example, be a two or more-pole, three-phase squirrel cage induction motor or a permanent magnet motor (PMM). However, other motor configurations may be possible.

The pump 116 may be an applicable pump that is capable of pumping production substances toward the surface of the wellbore 102. For example, the pump 116 may comprise a multi-stage centrifugal pump. The pump 116 may transfer pressure to the downhole fluid by adding kinetic energy to the downhole fluid via centrifugal force. The pump 116 may additionally convert the kinetic energy to potential energy in the form of pressure. The pump 116 may lift the downhole fluid to the surface 104. In some implementations, the pump 116 may be coupled to a pump flow control system above or proximate to the pump 116 which may comprise a housing. The pump flow control system may be configured to receive commands from the surface control system 106 and adjust one or more operating parameters of the pump 116.

The seal section 112 may be disposed between the motor 110 and the intake of the pump 116. The seal section 112 may function to isolate components higher in the wellbore 102 from the downhole fluids and may be configured to equalize a pressure in the wellbore 102 with pressure in the motor 110. In some implementations, the seal section 112 may function to receive and dissipate thrust generated from a column of the downhole fluid lifting through pump 116.

The gas separator 114 may be positioned between the pump 116 and the seal section 112 and motor 110 combination. The gas separator 114 may serve, at least in part, as an intake for the pump 116. In particular, the gas separator 114 may function to separate gas from downhole fluid in the wellbore and allow for the entry of the separated fluid into the pump 116. The gas separator 114 may be optional in the ESP system 150. The downhole fluid may be a multi-phase wellbore fluid comprising one or more hydrocarbons. For example, the fluid may be a two-phase fluid that comprises a gas phase and a liquid phase from the wellbore 102 or a reservoir in a subsurface formation 124. The downhole fluid may enter the wellbore 102 through one or more perforations in the subsurface formation 124 and flow uphole to one or more intake ports of the ESP system 150. The pump 116 may pump the separated liquid from the gas separator 114 to the surface 104. The separated liquid that is fed into the pump 116 may include dissolved gas in solution.

The production tubing 118 may be coupled to the pump 116 using one or more connectors. In some implementations, the production tubing may be coupled directly to the pump 116. One or more sections of the production tubing 118 may be coupled together to extend the ESP system 150 into the wellbore 102 to a desired depth or subsurface formation 124.

The electrical cable 120 may extend from the surface down to the ESP system 150. The electrical cable 120 may comprise a cable configured to convey power from power generation or power storage equipment at the surface 104 to the motor 110. In some implementations, the electrical cable 120 may be a round cable, a flat cable, or a combination thereof. In some implementations, the electrical cable 120 may be configured to convey data to and from the equipment at the surface 104 and the ESP system 150 in addition to supplying power to the motor 110. In some implementations, the data may comprise one or more control or operation instructions transmitted via the surface control system 106, of which the electrical cable 120 may be coupled with. The electrical cable 120 may be conveyed from the surface 104 to a packer (not shown) disposed along, between, or proximate to one or more sections of the production tubing 118. The electrical cable 120 may be passed through a feed-through or a penetrator of the packer to allow the electrical cable 120 to pass without jeopardizing a seal created by the packer. Below the packer, the electrical cable 120 may comprise a motor lead extension (MLE) coupled to a pothead of the motor 110, where the MLE is configured to provide electrical power to the motor 110. In some implementations, the electrical cable 120 may comprise a three individual wires, each comprising individual conductors and insulation sheaths. The electrical cable 120 comprising the three-wire system may be configured to convey three-phase AC power at a multi-kilowatt scale to power the motor 110.

Below the packer, the electrical cable 120 may be exposed to downhole fluids which may include contaminants such as hydrogen sulfide (H2S), various brines, and other corrosive and/or acidic compounds which may attack the cable. In particular, the H2S may attack the insulation sheath (insulating layer surrounding the conductor) or may attack the conductor within the electrical cable 120 itself. In some implementations, the conductor may comprise a metal such as copper. For example, hydrogen sulfide may permeate through the insulation sheath and chemically react with the copper used in the electrical cable 120 to form copper sulfide. Copper sulfide is a non-conductive material that has a lower density than that of elemental copper. The formation of the copper sulfide may also cause the conductor to swell, which may crack the insulation sheath and allow further H2S penetration. Oxygen impurities within the copper may be attacked by the H2S, which may create brittle regions along the electrical cable 120. Any damage caused by H2S attacks to the electrical cable 120 may incur costly production losses via downtime of the ESP system 150, costly workover operations to pull the ESP system 150 from the wellbore 102, etc.

Specifically, the disclosure now continues with a discussion of apparatuses and methods for protecting a conductive element of an electrical cable used in ESP applications through usage of a conductive binder. An example electrical cable similar to the electrical cable 120 is now described.

Example Composite Cable

Figure 2A:
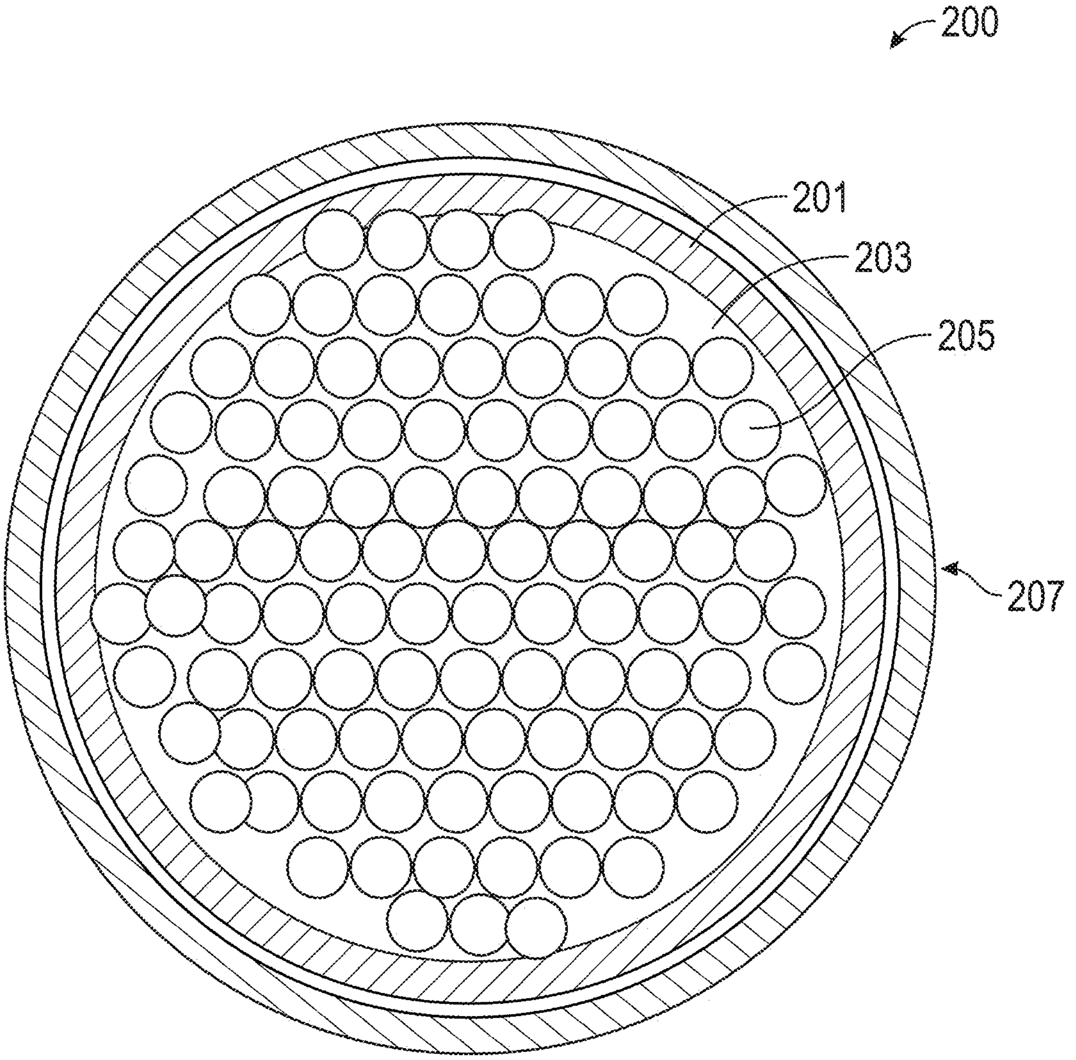
FIG. 2A depicts a cross-section of a first example composite cable comprising a conductive element a conductive binder, according to some implementations.

FIG. 2A depicts a cross-section of a first example composite cable 200 comprising a conductive element 205 and a conductive binder 203, according to some implementations. The conductive element 205 may comprise one or more electrically conductive wires/fibers to transmit power, instructions, and/or other data communications between the ESP system 150 and equipment at the surface 104 (which may include the surface control system 106). In some implementations, the conductive element 205 may comprise one or more continuous copper fibers, aluminum fibers, or magnesium fibers, although non-continuous configurations may be possible. In other implementations, the conductive element 205 may be comprised of any other conductive metal, alloy, or other suitably conductive substance. A conductive binder 203 may surround or be otherwise disposed among the conductive element 205. To surround the conductive element 205 may refer to the conductive binder 203 being disposed around a majority/plurality of a circumference of the conductive element 205. In some implementations, the conductive binder 203 may fully surround the conductive element 205, and the surrounding may include circumferentially enveloping the conductive element 205. The conductive binder 203 may be surrounded concentrically by an electrical insulator 201 and, optionally, a metal sheath 207. The composite cable 200 may be formed by coating fibers comprising conductive element 205 with the conductive binder 203. In some implementations, the conductive binder 203 may be installed into the composite cable 200 as one or more solid fibers among the fibers comprising the conductive element 205.

In some implementations, the conductive binder 203 may be configured to solidify (or remain as a solid) at the surface 104 and during assembly. However, when placed into the wellbore 102, a formation temperature may cause the conductive binder 203 to melt. A melt or melting condition may refer to a partial or full phase change from the solid phase. In other implementations, a melt may refer to a change in state from a higher viscosity to a lower viscosity in which an entropy of the substance is increased without entering a vapor or plasma phase. For example, a low-viscosity molten fluid (which was previously solid), and a semi-liquid slurry comprising a high viscosity may both be referred to as melted. These fluids may additionally be referred to as liquids, as may any substance in a phase that is not in a fully solid state (solidus) and has not yet fully evaporated into a vapor or gaseous phase. The melted conductive binder 203 may form a liquid conductor that is wicked to or otherwise dispersed among the fibers of the conductive element 205. In some implementations, the wicking may be performed via a polymer, a paper, a mesh, or through the surface of the fibers comprising the conductive element 205. The conductive binder 203 may also form a coating circumferentially positioned around the conductive element 205 and disperse among the fibers upon melting. In other implementations, the conductive binder 203 may coat each individual fiber comprising the conductive element 205, and many other configurations may be possible.

The surface of the fibers comprising the conductive element 205 may be treated prior to being conveyed into the wellbore 102 to increase their surface roughness, to include an oxidation layer, to remove an oxidation layer, or augment any other feature to aid in the wicking of the conductive binder 203 to the conductive element 205. The electrical insulator 201 may surround both the conductive element 205 and the conductive binder 203. Together, the conductive binder 203, the conductive element 205, and the electrical insulator 201 may comprise the composite cable 200. In some implementations, the composite cable 200 may be used as an electrode in an electrical wet connection downhole. The fibers comprising the conductive element 205 may provide conduction while the conductive binder 203 may provide additional strength and reformability in the event of corrosion, passivation, or other electrical open-circuit events. In some implementations, the conductive binder 203 may act as a conductive matrix for the conductive element 205.

The formation of the liquid conductor from the conductive binder 203 may occur in the wellbore 102 proximate to one or more of the subsurface formations 124 because, in some implementations, the conductive binder 203 may be configured to have a melting temperature that is less than the formation temperature. Thus, the conductive binder 203 may exist as a liquid proximate to a target formation, location, or depth comprising a known or approximated formation temperature. In other implementations, the conductive binder 203 may be designed to melt with reference to various other parameters. For example, the conductive binder 203 may be engineered to activate (melt) under various well parameters including pressure and depth, operational parameters including a power threshold, and tool parameters depending on a design of one or more tools in the wellbore 102. Any breaks, gaps, or corrosion-induced fractures in the composite cable 200 may be effectively bridged by the molten conductive binder 203 to allow power flow to continue. Additionally, hydrogen embrittlement from H2S invasion may be greatly reduced because the conductive binder 203 may no longer comprise grain boundaries for the hydrogen to attack when in the liquid phase.

Many materials and combinations may be used for the conductive binder 203. In some implementations, the conductive binder 203 may comprise a fusible alloy. The fusible alloy may comprise, for example, lead, tin, bismuth, indium, cadmium, gallium, and silver, but other metals and combinations may be possible. The conductive binder 203 may also be comprised of a metal (e.g., pure bismuth) rather than an alloy. In other implementations, the conductive binder 203 may comprise a conductive polymer (including aromatic cycle polymers such as polyaniline, polypyrrole, poly (thiophene), and poly(p-phenylene sulfide) and double bond polymers such as poly(acetylene) and aromatic double bond polymers such as poly(p-phenylene vinylene), a conductive composite (such as a polymer with carbon fiber or metal fiber such as an electrically conductive silicone), a conductive gel (such as a hydrogel with ionic species), a partially-conductive substance, or any other material capable of conducting electricity. In some implementations, the conductive gel may not melt in a traditional sense-rather, with the increased heat experienced downhole, the viscosity of the conductive gel may decrease and permit increased flow of the gel. Thus, the conductive gel may mimic a solid to liquid phase transformation in which an entropy of the conductive gel is increased.

In other implementations, various cable designs and configurations may be used in conjunction with a conductive binder similar to the conductive binder 203. The following figures depict multiple example configurations of such cables.

Figure 2B:
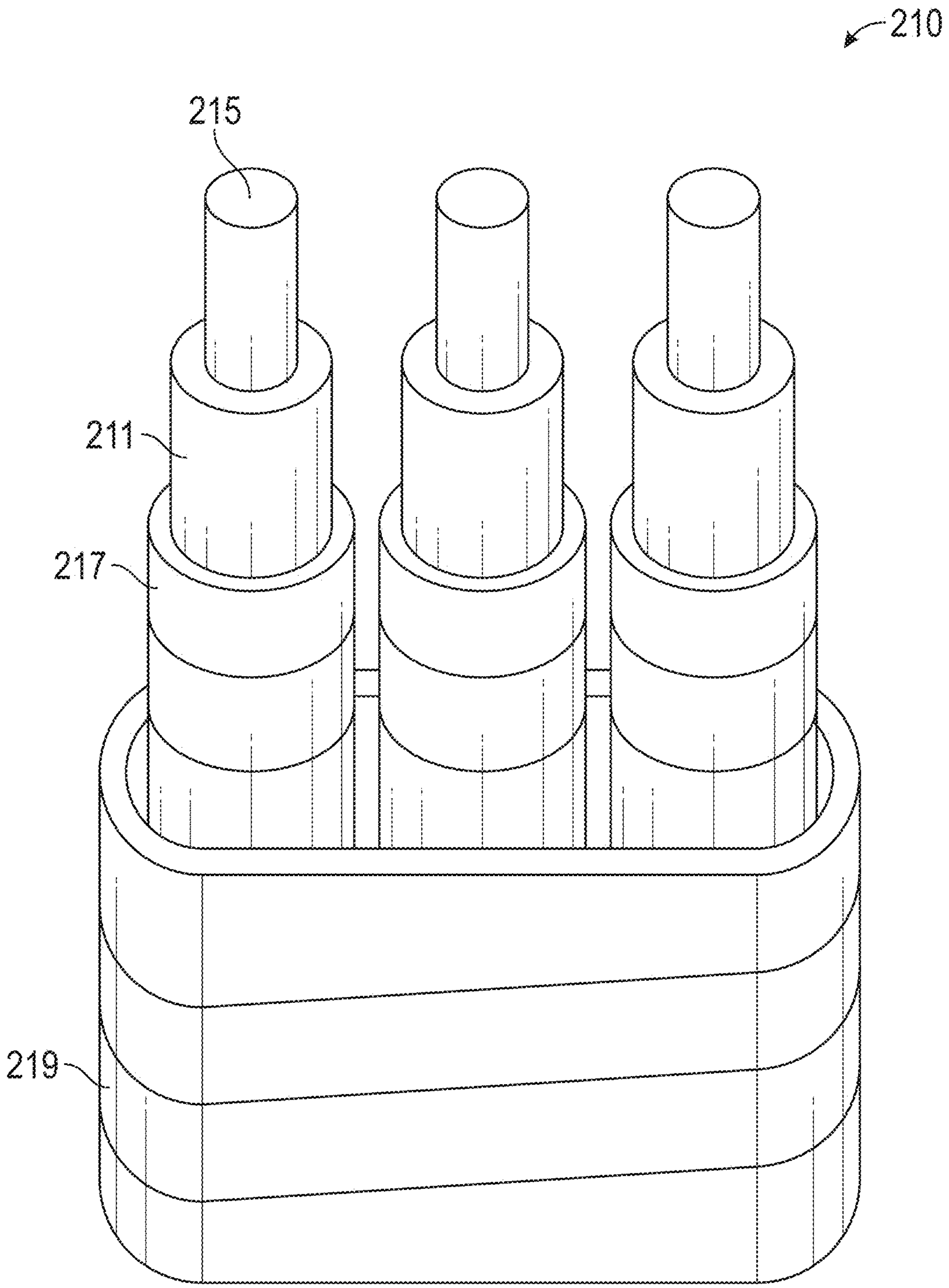
FIG. 2B depicts an illustration of a second example composite cable configuration, according to some implementations.

FIG. 2B depicts an illustration of a second example composite cable configuration, according to some implementations. A composite cable 210 may comprise a conductive element 215 which may be similar to the conductive element 205 of FIG. 2A. A conductive binder may be disposed among the conductive element 215. An insulation sheath 211 may be disposed around the conductive element 215. In some implementations, the insulation sheath 211 may be comprised of EPDM. The composite cable 210 may further comprise a metal sheath 217 disposed around the insulation sheath 211. In some implementations, the metal sheath 217 may be similar to the metal sheath 207. The composite cable 210 is a flat cable comprising three phases, each phase including the conductive element 215, insulation sheath 211, and metal sheath 217. An armor 219 may be disposed around all three phases of the composite cable 210. In some implementations, the armor 219 may be comprised of galvanized steel or an alloy configured for use in a subsurface environment.

Figure 2C:
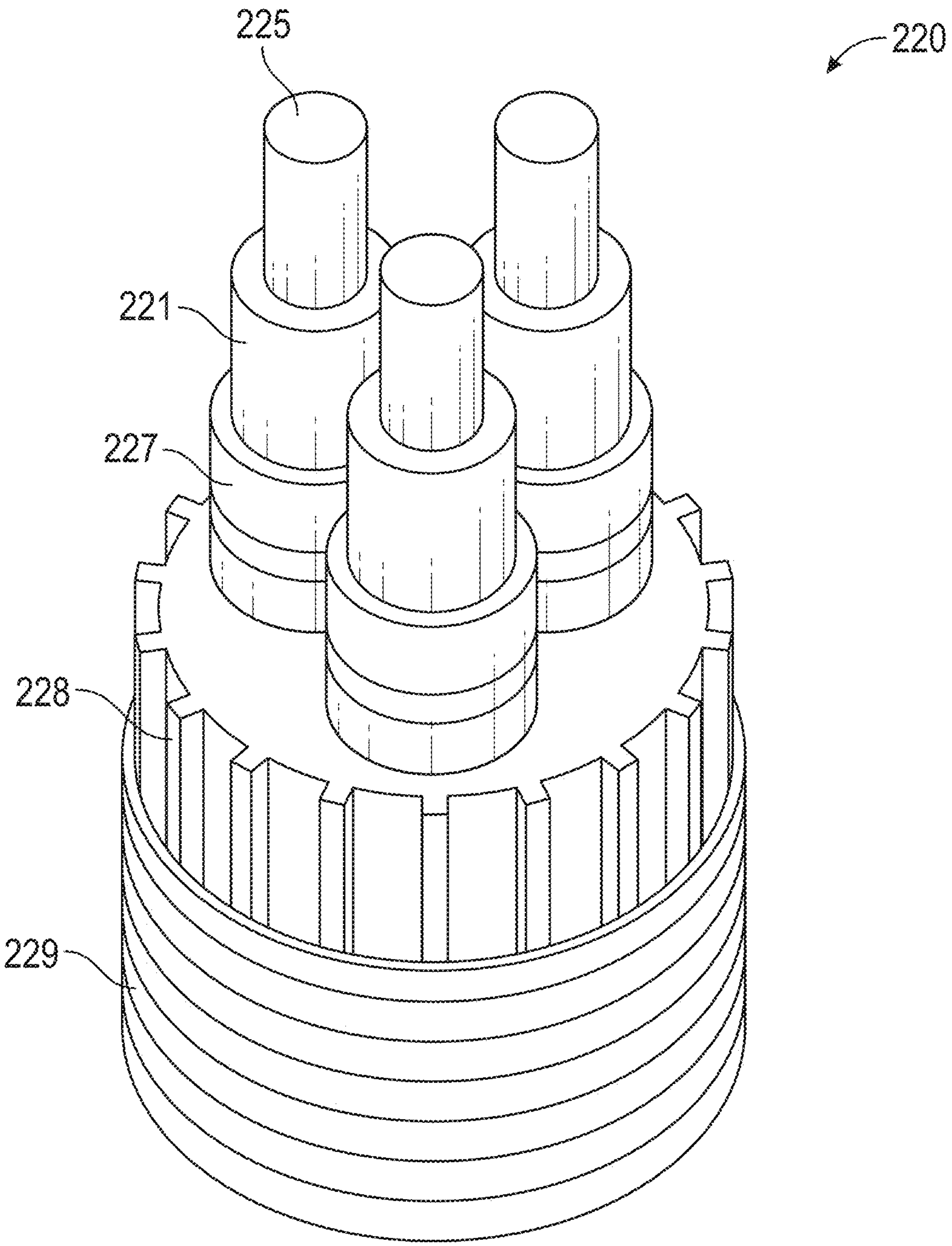
FIG. 2C depicts an illustration of a third example composite cable configuration, according to some implementations.

FIG. 2C depicts an illustration of a third example composite cable configuration, according to some implementations. A composite cable 220 may comprise a conductive element 225 which may be similar to the conductive element 205 of FIG. 2A. An insulation sheath 221 may be disposed around the conductive element 215. In some implementations, the insulation sheath 211 may be comprised of EPDM. The composite cable 220 may further comprise a metal sheath 227 disposed around the insulation sheath 221. In some implementations, the metal sheath 227 may be similar to the metal sheath 207. The composite cable 220 is a round cable comprising three phases, each phase including the conductive element 225, insulation sheath 221, and metal sheath 227. The three phases may be twisted together, and an EPDM jacket 228 may be extruded over the three phases. An armor 229 may be disposed around all three phases of the composite cable 220. In some implementations, the armor 229 may be comprised of galvanized steel or an alloy configured for use in a subsurface environment.

Figure 2D:
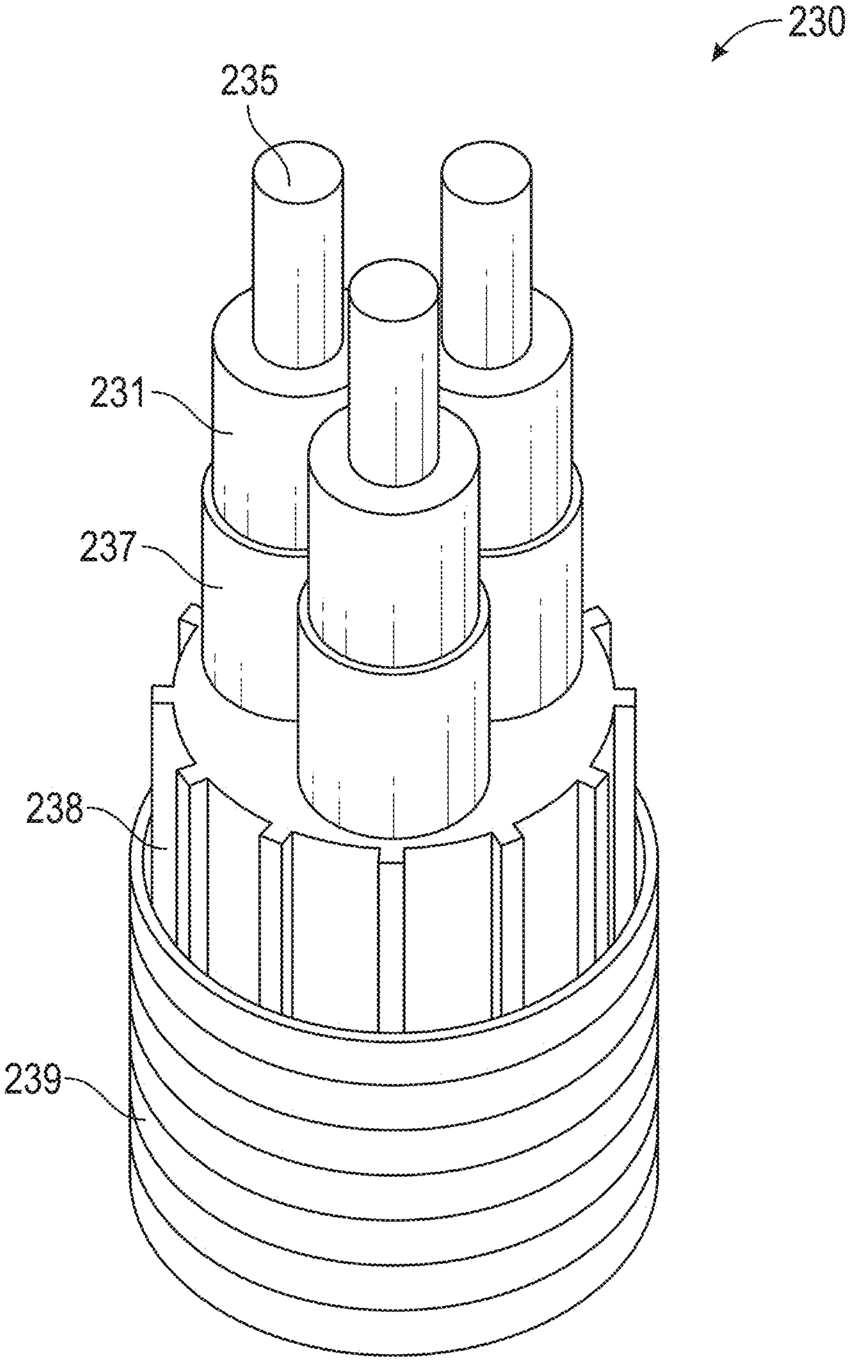
FIG. 2D depicts an illustration of a fourth example composite cable configuration, according to some implementations.

FIG. 2D depicts an illustration of a fourth example composite cable configuration, according to some implementations. A composite cable 230 may comprise a conductive element 235 which may be similar to the conductive element 205 of FIG. 2A. An inner insulation sheath 231 may be disposed around the conductive element 235. In some implementations, the inner insulation sheath 231 may be comprised of EPDM. The composite cable 220 may further comprise an outer insulation sheath 237 disposed around the inner insulation sheath 231. In some implementations, the outer insulation sheath 237 is also comprised of EPDM. The composite cable 230 is a round cable comprising three phases, each phase including the conductive element 235, inner insulation sheath 231, and outer insulation sheath 237. The three phases may be twisted together, and an EPDM jacket 238 may be extruded over the three phases. An armor 239 may be disposed around all three phases of the composite cable 230. In some implementations, the armor 239 may be comprised of galvanized steel or an alloy configured for use in a subsurface environment.

Figure 2E:
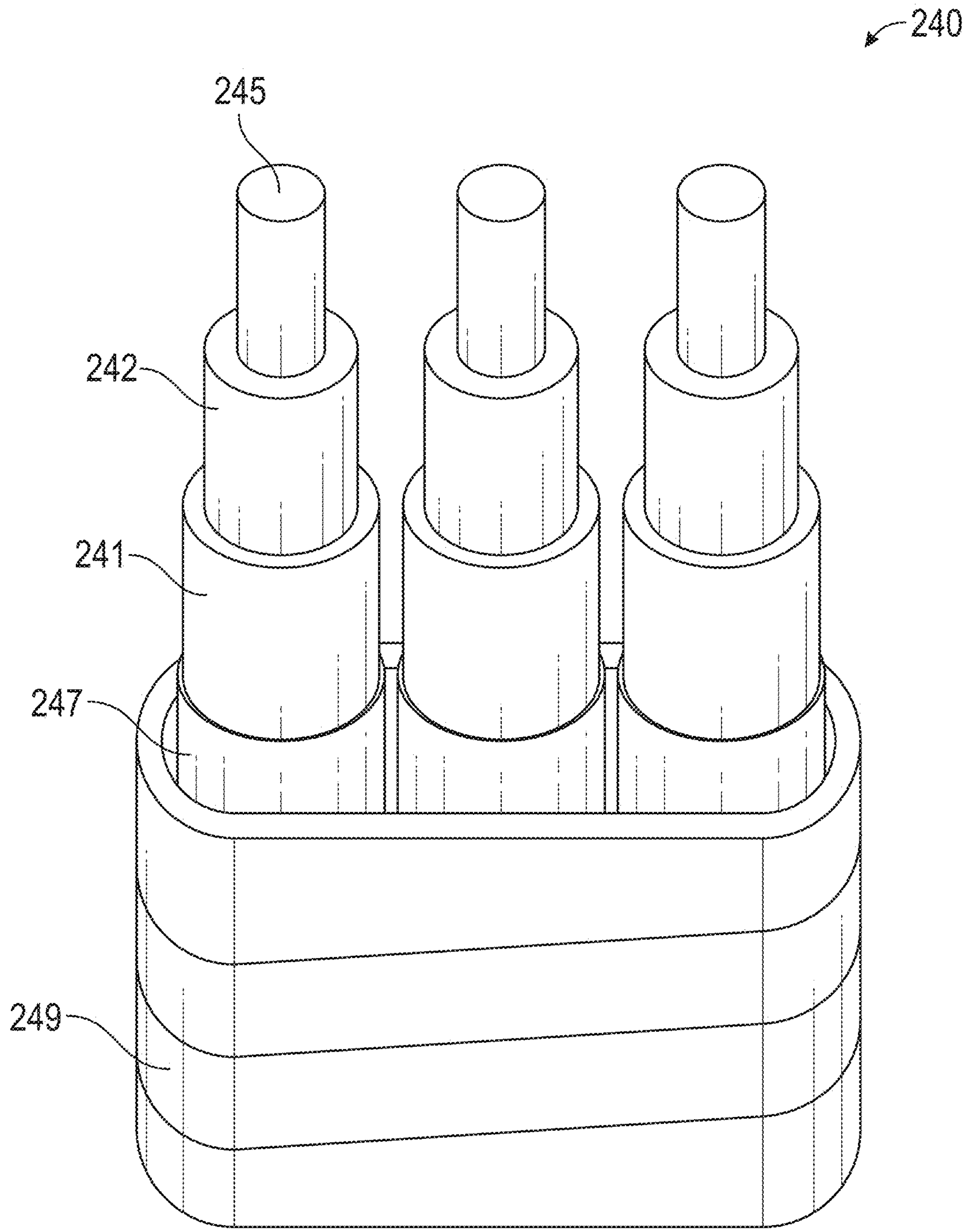
FIG. 2E depicts an illustration of a fifth example composite cable configuration, according to some implementations.

FIG. 2E depicts an illustration of a fifth example composite cable configuration, according to some implementations. A composite cable 240 may comprise a conductive element 245 which may be similar to the conductive element 205 of FIG. 2A. A polypropylene layer 242 may be extruded over the conductive element 245. An insulation sheath 241 may be disposed around the polypropylene layer 242. In some implementations, the insulation sheath 241 may be comprised of EPDM. The composite cable 240 may further comprise a metal sheath 247 disposed around the insulation sheath 241. In some implementations, the metal sheath 247 may be similar to the metal sheath 207. The composite cable 240 is a flat cable comprising three phases, each phase including the conductive element 245, polypropylene layer 242, insulation sheath 241, and metal sheath 247. An armor 249 may be disposed around all three phases of the composite cable 240. In some implementations, the armor 249 may be comprised of galvanized steel or an alloy configured for use in a subsurface environment.

Figure 2F:
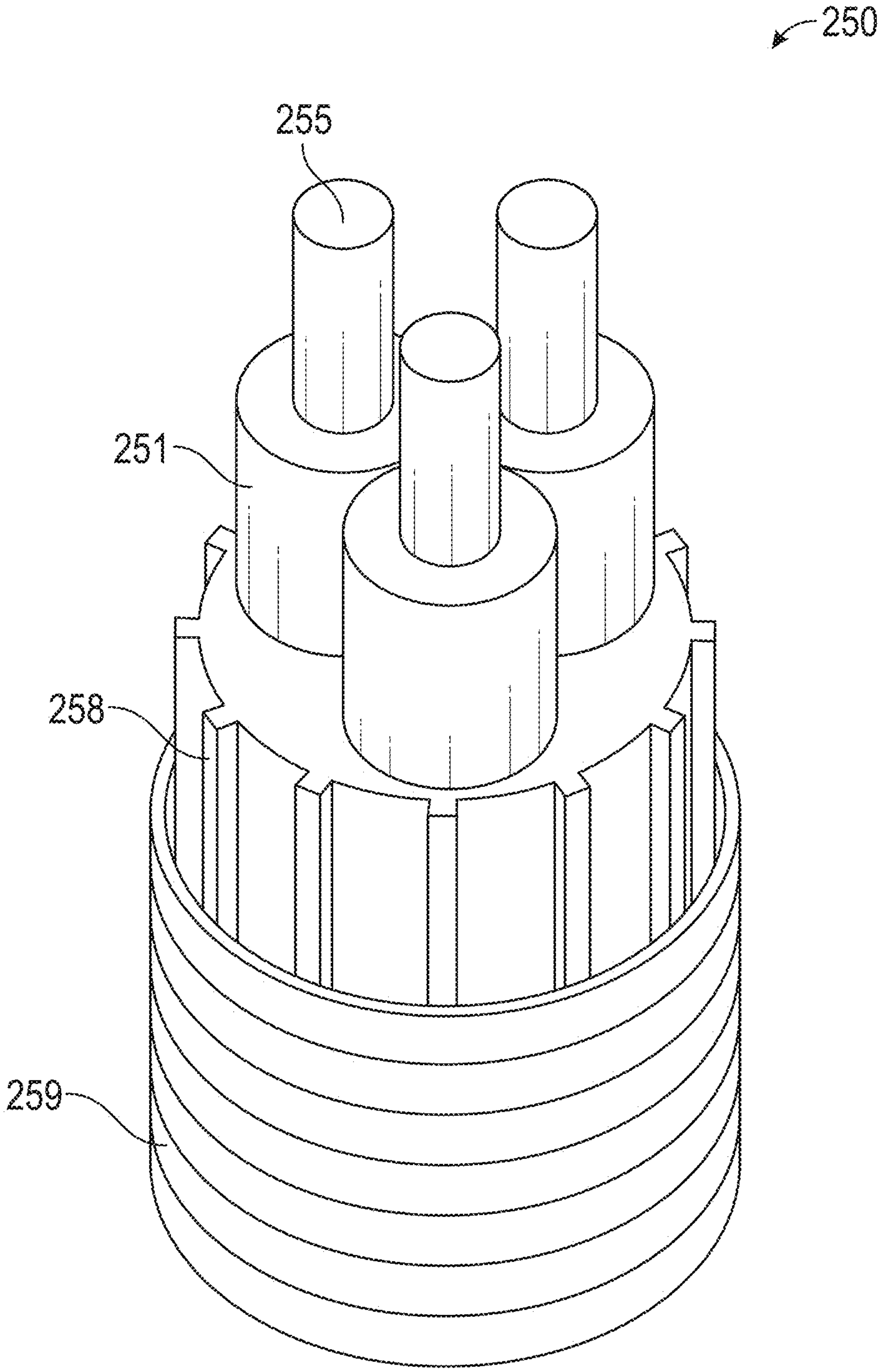
FIG. 2F depicts an illustration of a sixth example composite cable configuration, according to some implementations.

FIG. 2F depicts an illustration of a sixth example composite cable configuration, according to some implementations. A composite cable 250 may comprise a conductive element 255 which may be similar to the conductive element 205 of FIG. 2A. A polypropylene layer 252 may be extruded over the conductive element 255. The composite cable 250 is a round cable comprising three phases, each phase including the conductive element 255 and polypropylene layer 252. The three phases may be twisted together, and a low-swell nitrile jacket 258 may be extruded over the three phases. An armor 259 may be disposed around all three phases of the composite cable 250. In some implementations, the armor 259 may be comprised of galvanized steel or an alloy configured for use in a subsurface environment.

Example Fusible Alloys

Fusible alloys used as the conductive binder 203 may be comprised of either eutectic or non-eutectic compositions. Non-eutectic compositions may either be hypo-eutectic or hyper-eutectic. In some implementations, hypoeutectic and hypereutectic compositions may require at least two metals to form the fusible alloy. A temperature at which the fusible alloy undergoes a phase transformation from a solid to a liquid may be predetermined. A ratio of the metals in the fusible alloy may be adjusted to yield the predetermined phase transformation temperature or temperature range. Non-eutectic alloys tend to comprise a range of temperature values at which a melt occurs. Because of this, non-eutectic alloys may transition through a semi-liquid state between being purely liquid (liquidus) and being purely solid (solidus) during a melt, while eutectic alloys may melt at a single known temperature value.

Generally, a eutectic composition may comprise a mixture of two or more substances that undergo a solid-liquid phase transformation at a lower temperature than any other composition made up of the same substances. As previously stated, a eutectic composition, by definition, may not contain only a single composition of metal—i.e., the temperature at which a eutectic composition undergoes the solid-liquid phase transformation is a lower temperature than any point at which a composition comprising the same substances may freeze or melt at. This lower temperature is referred to as the eutectic temperature. A solid-liquid phase transformation temperature may also be referred to as the freezing point or melting point of a substance or composition. The eutectic composition may undergo the solid-liquid phase transformation at a temperature that is lower than the solid-liquid phase transformations of at least one of the individual substances making up the composition. The solid-liquid phase transformation temperature may be greater than one or more of the individual substances making up the composition but should be less than at least one of the substances. By way of example, the melting point of bismuth at atmospheric pressure is 520° F. (271° C.), and the melting point of lead is 621° F. (327° C.); however, the melting point of a composition containing 55.5% bismuth and 44.5% lead has a melting point of 244° F. (118° C.). Thus, the bismuth-lead composition described above comprises a lower melting point than either elemental bismuth or elemental lead. However, not all compositions have a melting point that is lower than all of the individual substances making up the composition. By way of example, a composition of silver and gold may have a higher melting point compared to pure silver and pure gold. Therefore, a silver-gold composition may not be classified as a eutectic composition.

A eutectic composition may also be differentiated from other compositions because it solidifies (or melts) at a single, precise temperature. As previously stated, non-eutectic compositions may generally have a range of temperatures at which the composition melts. However, there are other compositions that may have both: a range of temperatures at which the composition melts, and a melting point less than at least one of the individual substances making up the composition. These other substances may be referred to as hypo-eutectic and hyper-eutectic compositions. A hypo-eutectic composition may contain a minor substance (i.e., the substance that is in the lesser concentration) in a smaller amount than in the eutectic composition of the same substances. A hyper-eutectic composition contains the minor substance in a larger amount than in the eutectic composition of the same substances. Generally, with few exceptions, a hypo- and hyper-eutectic composition may have a solid-liquid phase transition temperature higher than the eutectic temperature but less than the melting point of at least one of the individual substances making up the composition. Non-eutectic compositions including hypo- and hyper-eutectic compositions may be used as the conductive binder 203 because there may exist a much wider array of possible melting temperatures to configure via alloying and varying ratios of the substances comprising the composition. Thus, non-eutectic compositions may have greater design flexibility in obtaining desired liquidus and solidus temperatures. Eutectic compositions, however, may only be available at specific melting temperatures that may not be as easily adjusted. Additionally, the range of melting temperatures offered by hypo- and hyper-eutectic compositions may induce semi-liquid (slush/slurry) characteristics during a melt.

In some implementations, the semi-liquid characteristics may make it easier for mechanical seals to retain a composition during a solid to liquid phase change at a wet connect. In a wet connection, one or more mechanical seals may be located on either side of electrical connection. When for example, a eutectic composition melts, the composition may comprise a density similar to that of steel but a viscosity similar to that of water. This may be more difficult to contain via the mechanical seals than would a semi-liquid, non-eutectic composition comprising a similar melting temperature range.

The following table illustrates example eutectic, hypo-eutectic and hyper-eutectic compositions. The concentration of each substance making up the composition is expressed as a percentage by weight of the composition, and their corresponding eutectic temperature and melting temperature ranges are also depicted.

TABLE 1

| Type of Composition | Concentration of Bi | Concentration of Lead | Concentration of Tin | Concentration of Cadmium | Melting Temperature (F.) |
|---|---|---|---|---|---|
| Eutectic | 50 | 26.7 | 13.3 | 10 | 158 |
| Hyper-eutectic | 50 | 25 | 12.5 | 12.5 | 158-165 |
| Hypo-eutectic | 50.5 | 27.8 | 12.4 | 9.3 | 158-163 |

As seen in Table 1, the hyper-eutectic composition may contain cadmium (the minor substance) in a larger amount than the eutectic composition, and the hypo-eutectic composition may contain cadmium in a smaller amount than in the eutectic composition. Both the hyper-eutectic and hypo-eutectic compositions may melt over a range of temperatures, whereas, the eutectic composition may comprise the single melting temperature. Moreover, all 3 example compositions depicted in Table 1 may comprise a eutectic temperature or melting point range that is lower than each of the 4 individual elements-Bi melts at 520° F. (271.1° C.), Pb melts at 621° F. (327.2° C.), Sn melts at 450° F. (232.2° C.), and Cd melts at 610° F. (321.1° C.).

FIG. 3 depicts a table of example fusible alloys and their properties, according to some implementations. A table 300 depicts a product list of from Indalloy detailing various alloys and their associated properties, such as density, elemental composition, liquidus and solidus temperatures, etc. For example, Indalloy Number 51 is a eutectic alloy (see symbol "E" next to the liquidus temperature in Celsius) comprised of 62.5% Gallium, 21.5% Indium, and 16% Tin. This alloy may melt at 51° F.—above this temperature, the alloy is entirely liquid (liquidus) and below this temperature the alloy is entirely solid (solidus). In contrast, a non-eutectic alloy such as Indalloy Number 50 may melt between a solidus temperature of 203° F. and a liquidus temperature of 226° F. Between these temperatures, the alloy may comprise a semi-liquid composition. The conductive binder 203 may be designed to comprise a certain elemental composition in order to achieve a desired melting temperature or range of melting temperatures in the wellbore 102.

Alternate Implementations

In an alternate implementation, the conductive binder 203 may be designed with a melting temperature that is higher than the formation temperature. Thus, a conductive matrix of the conductive binder 203 may remain solid during normal operation when proximate to a target subsurface formation 124. The conductive binder 203 may, however, be configured to melt at a melting point including the formation temperature and an additional external heat source, such as resistive heat from an electrical short. During an electrical shorting or other open-circuit event in either the conductive element 205 or in a solid matrix of the conductive binder 203, electrical resistance may rise at the location of the short. This may result in the area around the short becoming hotter. The electrically induced heat created by the short may result in the conductive binder 203 melting. The molten conductive binder 203 may then bridge the electrical short. Upon bridging the short, resistance may fall, the additional heat may dissipate, and the conductive binder 203 may resolidify until another short or open-circuit event occurs.

In some implementations, the conductive binder 203 may be selected based on a power threshold at which melting is induced. Thus, melting of the conductive binder 203 may be induced at user discretion. For example, resistance along the composite cable 200 may be observed via a user interface at the surface 104. If the resistance begins to rise or degradation is observed along the composite cable 200, a user may induce repairs via the conductive binder 203 by supplying more power through the composite cable 200. The additional power may induce more resistive heating at one or more points of degradation along the composite cable 200, and the supplementary resistive heating may induce melting of the conductive binder 203. The conductive binder 203 may then fill any gaps, breaks, or points of degradation along the composite cable 200 and the conductive element 205. Once the composite cable 200 has been repaired by the conductive binder 203 in its liquid state, resistance may decrease over time, the resistive heat may dissipate, and the conductive binder 203 may resolidify. In situations where an electrical blow out occurs within the composite cable 200 (i.e., a damaging event where damage radiates outward from the conductive element 205), the conductive binder may also be configured to melt and mitigate damage to the composite cable 200. In some implementations, the conductive binder 203 may be designed with a melting point slightly above an expected formation temperature. In this configuration, minimal increases in resistive or other supplementary heating (e.g., due to minor damage of the composite cable 200) may induce partial or full melting of the conductive binder 203. Thus, the conductive binder 203 may be capable of self-healing in instances of minor damage to the composite cable 200.

While the conductive element 205 is described above as being a continuous fiber or bundle of fibers, in some implementations the conductive element 205 may be non-continuous. The fibers comprising the conductive element 205 may be configured as multiple overlapping discrete fiber sections to increase flexibility and reduce costs. In some implementations, the conductive element 205 may be configured as metal or other conductive additives in the conductive binder matrix. Should gaps form between sections of the discontinuous conductive element 205, the conductive binder 203 may bridge the gaps and allow for power to travel across the discontinuous sections.

Example Flowchart

Figure 4:
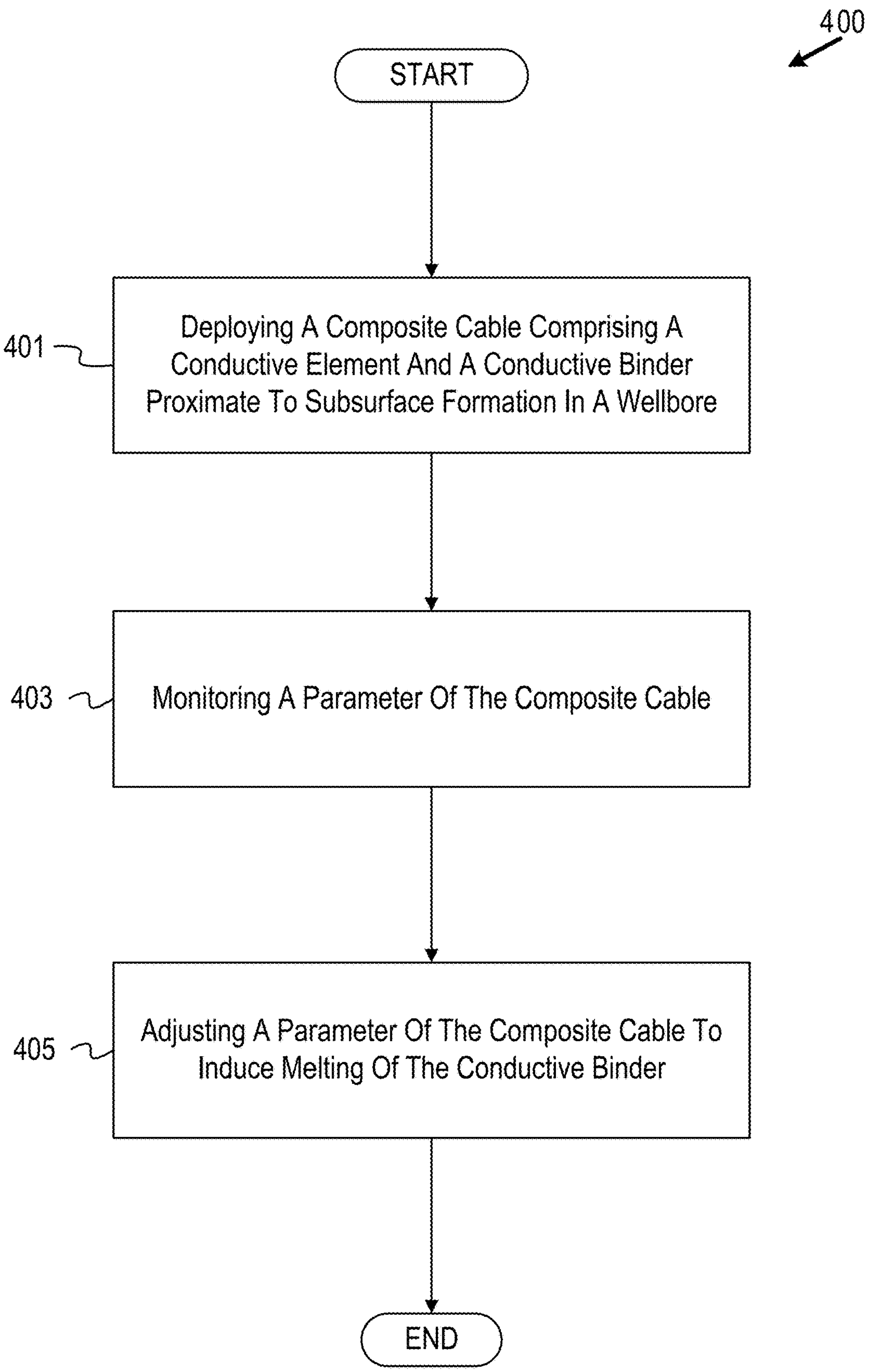
FIG. 4 depicts a flowchart of example operations, according to some implementations.

FIG. 4 depicts a flowchart of example operations, according to some implementations. Operations of a method 400 may be performed by software, firmware, hardware, or a combination thereof. Such operations are described with reference to FIGS. 1-2. However, such operations may be performed by other systems or components. The operations of the method 400 begin at block 401.

At block 401, the method 400 includes deploying the composite cable 200 comprising the conductive element 205 and the conductive binder 203 into the wellbore 102 proximate to one or more of the subsurface formations 124. Flow progresses to block 403.

At block 403, the method 400 includes monitoring a parameter of the composite cable 200. In some implementations, the parameter may comprise temperature of one or more sections of the composite cable 200, a depth of one or more sections of the composite cable 200, or a resistance along the composite cable 200. Flow progresses to block 405.

As block 405, the method 400 includes adjusting a parameter of the composite cable to induce melting of the conductive binder 203. In some implementations, this may comprise increasing a voltage/power supply down the composite cable 200 to induce melting of the conductive binder 203 via an influx of resistive heat at or proximate to a site where damage to the composite cable 200 has occurred. Flow of the method 400 ceases.

Example Wireline System

Figure 5:
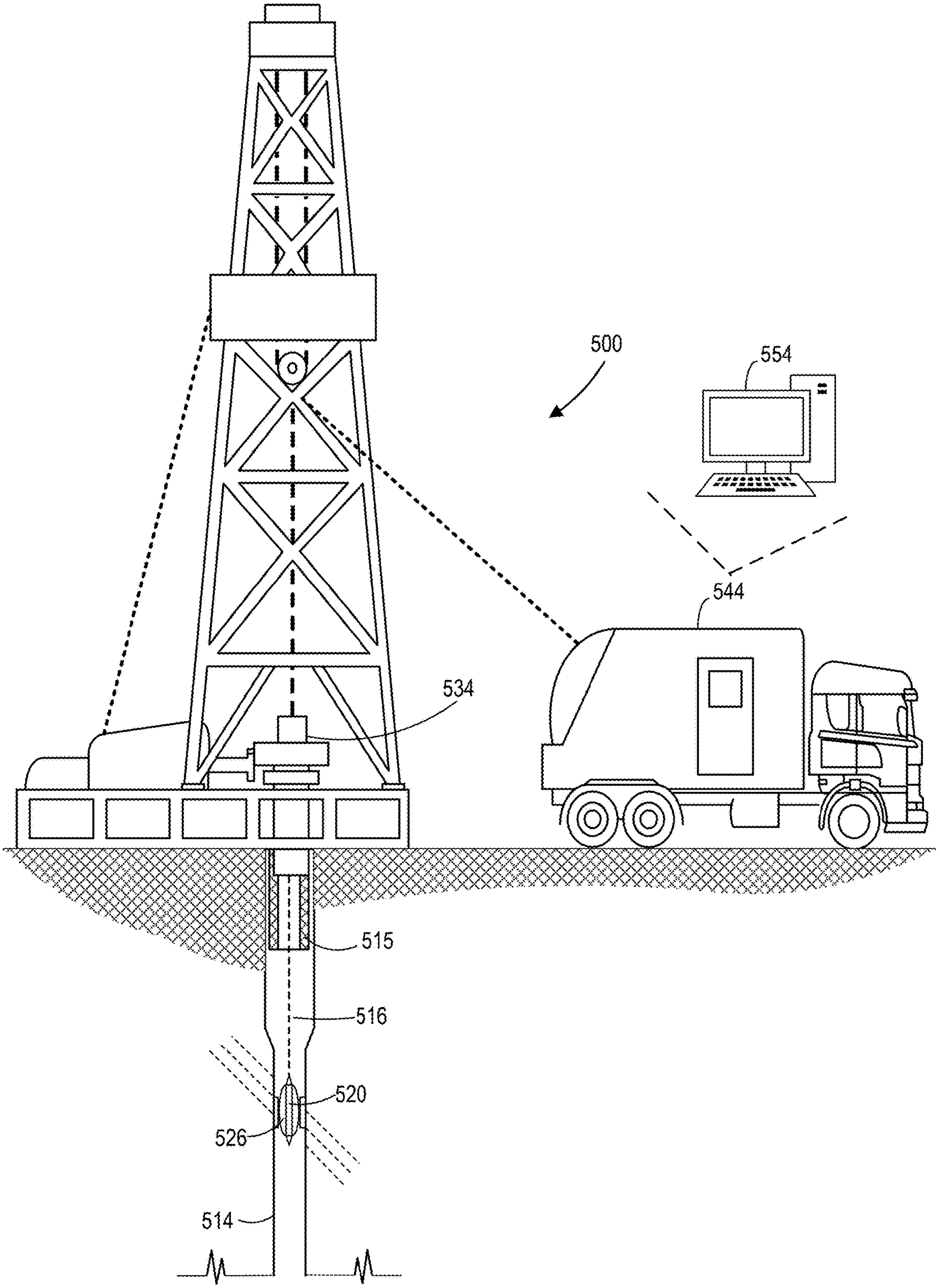
FIG. 5 depicts a schematic diagram of an example wireline system, according to some implementations.

FIG. 5 depicts a schematic diagram of a wireline system including a composite cable, according to some implementations. A system 500 may be used in an illustrative logging environment in accordance with some implementations of the present disclosure.

Subterranean operations may be conducted using a wireline system 520 once a drill string has been removed, though, at times, some or all of the drill string may remain in a wellbore 514 during logging with the wireline system 520. The wireline system 520 may include one or more logging tools 526 that may be suspended in the wellbore 514 through a casing 515 by a conveyance medium 516 (e.g., a cable, slickline, or coiled tubing). In some implementations, the conveyance medium 516 may include the composite cable 200 of FIG. 2A. The logging tool 526 may be communicatively coupled to the conveyance medium 516. The conveyance medium 516 may comprise one or more conductive elements for transporting power to the wireline system 520 and telemetry from the logging tool 526 to a logging facility 544. The logging facility 544 may include a computer system 554 capable of computing various logging parameters. Alternatively, the conveyance medium 516 may lack a conductive element, as is often the case using slickline or coiled tubing, and the wireline system 550 may contain a control unit 534 that contains memory, one or more power storage devices, and/or one or more processors for performing operations and storing measurements.

In some implementations, the control unit 534 may be positioned at the surface, in the wellbore 514, as part of the logging tool 526, or both (e.g., a portion of the processing may occur downhole and a portion may occur at the surface). The control unit 534 may include a control system or a control algorithm. In some implementations, a control system, an algorithm, or a set of machine-readable instructions may cause the control unit 534 to generate and provide an input signal to one or more elements of the logging tool 526, such as the sensors along the logging tool 526. The input signal may cause the sensors to activate or to output signals indicative of sensed properties. The logging facility 544 (shown in FIG. 5 as a truck, although it may be any other structure) may collect measurements from the logging tool 526 and may include computing facilities for controlling, processing, or storing the measurements gathered by the logging tool 526. The computing facilities may be communicatively coupled to the logging tool 526 by way of the conveyance medium 516 which may comprise the composite cable 200. In some implementations, the control unit 534, which may be located within the logging tool 526, may perform one or more functions of the computing facilities.

The logging tool 526 may include a mandrel and a number of extendible arms coupled to the mandrel. One or more pads may be coupled to each of the extendible arms. Each of the pads may have a surface facing radially outward from the mandrel. Additionally, one or more sensors may be disposed on the surface of each pad. During operation, the extendible arms may be extended outwards to a wall of the wellbore 514 to extend the surface of the pads to contact the wellbore 514. The one or more sensors on the pads of each extendible arm may detect image data to create captured images of the formation surrounding the wellbore 514, although various other types of data measurements may be obtained.

While the aspects of the disclosure are described with reference to various implementations and exploitations, it will be understood that these aspects are illustrative and that the scope of the claims is not limited to them. In general, techniques for protecting electrical cables via usage of a conductive binder as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" may be infringed with only one of the listed items, multiple of the listed items, and one or more of the items in the list and another item not listed.

Example Implementations

Implementation 1: An electrical cable for use in a wellbore proximate to a subsurface formation, the electrical cable comprising: a conductive element comprising one or more electrically conductive fibers; and a conductive binder configured to melt to form a liquid conductor that is configured to, when in a liquid state, surround the conductive element.

Implementation 2: The electrical cable of Implementation 1, wherein the conductive binder comprises a fusible alloy.

Implementation 3: The electrical cable of any one of Implementations 1-2, wherein the conductive binder comprises a non-metallic conductive material.

Implementation 4: The electrical cable of any one of Implementations 1-3, wherein the conductive binder is a solid at surface and configured to melt based on at least one of a depth, pressure, power threshold, and temperature.

Implementation 5: The electrical cable of Implementation 4, wherein the conductive binder is selected to have a melting point lower than a formation temperature, and wherein the conductive binder is configured to melt to form the liquid conductor proximate to the subsurface formation.

Implementation 6: The electrical cable of any one of Implementations 4-5, wherein the conductive binder is selected to have a melting point higher than a formation temperature, and wherein the conductive binder is configured to melt to form the liquid conductor when a supplementary heat source is introduced to the electrical cable.

Implementation 7: The electrical cable of Implementation 6, wherein the conductive binder is configured to melt and to repair the electrical cable, wherein the supplementary heat source is at least one of: a resistive heating from a short circuit in the electrical cable, and an increased power through the electrical cable controlled by a user at surface.

Implementation 8: An electric submersible pump (ESP) system configured to mitigate damage from contaminant invasion, the ESP system comprising: the ESP disposed in a wellbore proximate to a subsurface formation, wherein the ESP comprises a motor; and an electrical cable configured to couple to the motor, wherein the electrical cable comprises: a conductive element comprising one or more electrically conductive fibers; and a conductive binder configured to melt to form a liquid conductor that is configured to, when in a liquid state, surround the conductive element.

Implementation 9: The ESP system of Implementation 8, wherein the conductive binder is configured to bridge damage caused by the contaminant invasion when in the liquid state.

Implementation 10: The ESP system of any one of Implementations 8-9, wherein the conductive binder comprises a fusible alloy.

Implementation 11: The ESP system of any one of Implementations 8-10, wherein the conductive binder comprises a non-metallic conductive material.

Implementation 12: The ESP system of any one of Implementations 8-11, wherein the conductive binder is a solid at surface and configured to melt based on at least one of a depth, pressure, power threshold, and temperature.

Implementation 13: The ESP system of Implementation 12, wherein the conductive binder is selected to have a melting point lower than a formation temperature, and wherein the conductive binder is configured to melt to form the liquid conductor proximate to the subsurface formation.

Implementation 14: The ESP system of any one of Implementations 12-13, wherein the conductive binder is selected to have a melting point higher than a formation temperature, and wherein the conductive binder is configured to melt to form the liquid conductor when a supplementary heat source is introduced to the electrical cable.

Implementation 15: The ESP system of Implementation 14, wherein the conductive binder is configured to melt and to repair the electrical cable, wherein the supplementary heat source is at least one of: a resistive heating from a short circuit in the electrical cable, and an increased power through the electrical cable controlled by a user of the ESP.

Implementation 16: A method for inducing a repair of an electrical cable within a wellbore, the method comprising: deploying a composite cable into a wellbore proximate to a subsurface formation, wherein the composite cable comprises a conductive element and a conductive binder; monitoring a parameter of the composite cable; and adjusting the parameter of the composite cable to induce melting of the conductive binder.

Implementation 17: The method of Implementation 16 further comprising: selecting the conductive binder to have a melting point higher than a formation temperature, wherein the conductive binder remains a solid proximate to the subsurface formation until an external heat source is added.

Implementation 18: The method of Implementation 17, wherein monitoring the parameter of the composite cable comprises: monitoring a resistance along the composite cable, wherein a resistance value above a threshold indicates an electrical short along the composite cable.

Implementation 19: The method of Implementation 18 further comprising: supplying increased power through the composite cable to generate the external heat source via resistive heat at a location of the electrical short, wherein a combination of the formation temperature and the resistive heat exceeds the melting point of the conductive binder; and melting, via the increased power, the conductive binder to repair the electrical short.

Implementation 20: The method of Implementation 19, further comprising: reducing the power supplied through the composite cable upon repairing the electrical short, wherein the conductive binder resolidifies in an absence of the external heat source.

What is claimed is:

1. An electrical cable for use in a wellbore proximate to a subsurface formation, the electrical cable comprising:

a conductive element comprising one or more electrically conductive fibers; and a conductive binder comprising a conductive material having a melting temperature, wherein the conductive binder transitions from a solid state to a liquid state when a temperature of at least a portion of conductive binder exceeds the melting temperature due to thermal energy from a surrounding wellbore environment or from electrical current flow within the electrical cable, and wherein the conductive binder, when in the liquid state, flows to form an electrically conductive pathway through the electrical cable.

2. The electrical cable of claim 1, wherein the conductive binder comprises a fusible alloy.

3. The electrical cable of claim 1, wherein the conductive binder comprises a non-metallic conductive material.

4. The electrical cable of claim 1, wherein the conductive binder is in the solid state at surface, and wherein the conductive material is and configured to melt based on at least one of a depth of the electrical cable in the wellbore or a pressure in the wellbore.

5. The electrical cable of claim 1, wherein the conductive material is selected to have a melting point lower than a formation temperature of the subsurface formation, and wherein the conductive binder transitions from the solid state to the liquid state when the electrical cable is positioned proximate to the subsurface formation.

6. The electrical cable of claim 1, wherein the conductive material is selected to have a melting point higher than a formation temperature of the subsurface formation, and wherein the conductive binder transitions from the solid state to the liquid state due to the electrical current flow in the electrical cable.

7. The electrical cable of claim 1, wherein the electrical current flow within the electrical cable comprises at least one of a current associated with an electrical fault in the electrical cable or an increase in electrical power through the electrical cable above a power threshold.

* * * * *